(No Model.)
F. RICHARDS.
TRANSPLANTER.
No. 536,895.   Patented Apr. 2, 1895.
Fig: 1.
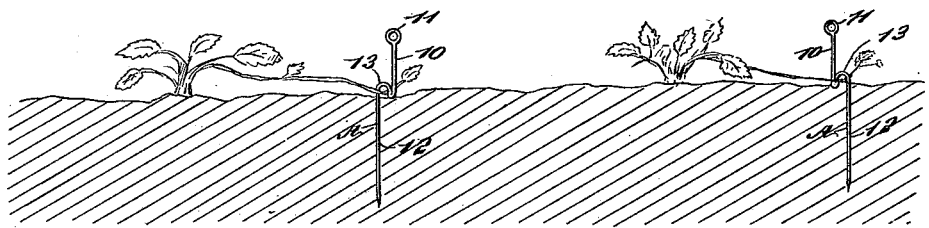
Fig: 2.  Fig: 4.  Fig: 5.
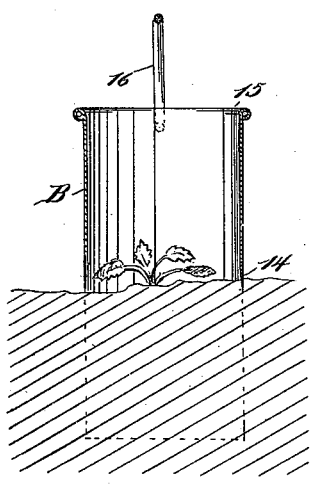
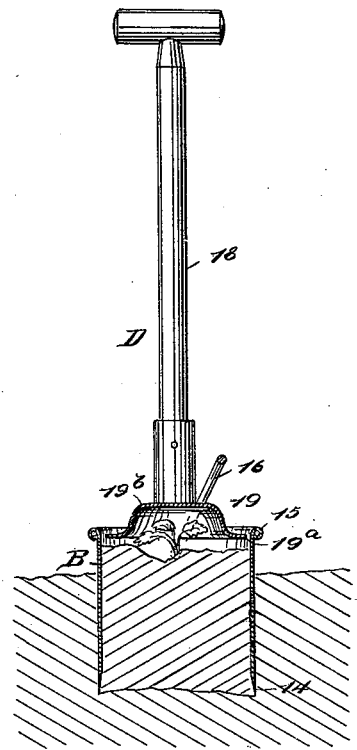
Fig: 3.
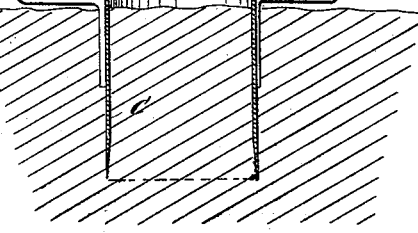
WITNESSES:
Chas. Nidor
Fred Acker
INVENTOR
F. Richards
BY
Munn & Co
ATTORNEYS.

UNITED STATES PATENT OFFICE.

FREDERICK RICHARDS, OF FREEPORT, NEW YORK.

TRANSPLANTER.

SPECIFICATION forming part of Letters Patent No. 536,895, dated April 2, 1895.

Application filed November 2, 1894. Serial No. 527,715. (No model.)

*To all whom it may concern:*

Be it known that I, FREDERICK RICHARDS, of Freeport, in the county of Queens and State of New York, have invented a new and Improved Transplanter for Transplanting Strawberry and other Running Plants, of which the following is a full, clear, and exact description.

My invention relates to a transplanting device, or devices particularly adapted for transplanting strawberry and other running plants, and the object of this invention is to provide a simple, durable and economic means whereby a plant, or any sectional rooted portion of a plant may be removed from the ground, surrounded by earth, and its roots not interfered with, and be held in said device until desired for planting, and whereby also through the medium of the device of like character to that receiving the plant, holes may be made in the field at suitable distances apart, the holes being of such shape and size as to neatly receive the plant-holding device, whereby upon withdrawing the plant-holding device from around the plant, the plant will be undisturbed yet transferred to the field in which it is intended to grow, thus preventing the plant from being set back or retarded in its growth.

A further object of the invention is to provide a device whereby the plant and the earth surrounding it may be removed from the plant-retaining device expeditiously and conveniently, and without injuring the plant; and furthermore to provide a means whereby the runners of the plant may be held in engagement with the ground and prevented from becoming entangled with each other until the runners have become rooted.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a view illustrating the application of retaining pins to the runners of a strawberry plant for the purpose of holding the runners in engagement with the ground. Fig. 2 is a vertical section through the plant receiver, or retaining receptacle, adapted primarily for the reception and transportation of the plant to be transplanted. Fig. 3 is a plan view of this plant receiving vessel. Fig. 4 is a sectional view of the vessel adapted to remove ground from the field and thus prepare an opening for the reception of the plant to be transplanted; and Fig. 5 is a sectional view through the plant receiving or retaining vessel, illustrated as placed in an opening prepared for it in a field, and it is likewise a section through a portion of a device for dislodging the plant and surrounding earth from the plant-receiving vessel.

In carrying out the invention the retaining pins A are constructed as shown in Fig. 1 preferably of stout wire rod of suitable thickness, bent upon itself to form a shank 10, usually provided with an eye 11 or its equivalent, a body section 12, adapted to enter the ground, and an intermediate curved section 13, which connects the body with the shank, placing these two parts in different planes, the shank being to one side of the body.

The parent strawberry plants produce runners, which are to be rooted, and the runners where they take root are transplanted to form the bearing or yielding vine. The runners have heretofore been held to the ground by means of stones, or equivalent weighty objects near at hand, or by placing earth upon them. The stones bruise the runners, while the earth is washed away in the event of a rain, and the stones often become dislodged, in which event the vines frequently become twisted together, and it is a difficult task to separate them. The retaining pins A avoid all such difficulties, since it is simply necessary to push the body portions thereof into the ground until their intermediate bow sections are brought properly in contact with the runners where it is intended they shall become rooted; and the pins may be used any number of times and are exceedingly inexpensive.

The transplanter proper consists of a vessel B, which is adapted to receive and retain the plant to be transplanted, as shown in Figs. 2, 3 and 5. The vessel is cylindrical or circular in cross section. It is open at top and bottom, and is of predetermined diameter, its lower edge being sharpened, as shown at 14 in Fig. 2. The vessel is strengthened at its upper edge in any approved manner, usually by forming a rib 15 at that point, and is likewise provided at its upper end with a bail handle 16, pivotally connected therewith, and adapted, when not in use, to fold down over the outer surface of the vessel at one side, as shown in Fig. 3.

The vessel C which is utilized to make the openings in the field to receive the plants may be termed a preparatory vessel, and is shown in Fig. 4. This vessel is of a cylindrical shape, and is of the same dimensions as the receiving vessel B, but it is provided with a rigid handle 17, in the nature of a bail, the handle being firmly attached to the outer side surfaces of the vessel, and it extends outwardly at right-angles therefrom and then upward to complete its bow section, the handle being of such a length that it may be readily grasped in the hand by a person in a standing position, while a foot of the person is placed upon the upper edge of the said preparatory vessel.

In connection with the receiving vessel, a delivery device D is employed, and this device consists preferably of a handle 18 and a body section 19, the latter being shaped as an inverted dish, comprising a horizontal outer flanged section $19^a$ and a central section $19^b$, concaved upon its under face.

The operation is substantially as follows: After the runners have become rooted, any desired number of the receiving vessels are carried to the field from which the plants are to be taken. The pins A are withdrawn from the ground, and the receiving vessel is placed over the rooted portion of the runner. The vessel is then pressed downward into the ground by a foot of the operator until the top has closely approached the ground. The retaining vessel is then lifted out of the ground, and will contain the plant, and the earth around the root, the earth being closely packed in the vessel. The vessels containing the plants may then be placed upon a wheelbarrow, wagon or other form of vehicle, and their bails lowered to the position shown in Fig. 3. In this manner a large number of receiving vessels, each containing a plant and the earth around its roots, may be packed in one vehicle, and it is obvious that the roots of the plants will be in no manner disturbed.

The field in which the plants are to be transplanted has been previously prepared, the preparatory vessel C, having been used for that purpose; and such preparation is made by the person carrying the preparatory vessel forcing it into the ground with the foot until, for example, the lower portion of the handle engages with the ground, as shown in Fig. 4. The vessel is then withdrawn from the ground and given a slight shake, and the earth that is carried by it will be dislodged. In this manner holes to receive the plants may be prepared in suitable rows as rapidly almost as the operator can conveniently walk over the field. Into each of the holes thus prepared a receiving vessel containing a plant is lowered, and the preparatory vessel being of the same diameter as the receiving vessel the latter will neatly fit into the hole. The delivery device is then placed into the receiving vessel, the plant entering the concaved section of its body and the flange resting upon the earth around the plant; and by holding the delivery device firmly in this position and drawing upward the receiving vessel, the plant and earth will be slipped to its position in the field without in the least disturbing the earth surrounding the plant, or the roots or the leaves of the latter.

Having thus described my invention, I claim as new and desire to secure by Letters Patent—

1. A transplanter, comprising a receiving vessel open at top and bottom and provided with a bail, a preparatory vessel open at top and bottom and provided with a rigid handle, and a delivering device, consisting of an inverted disk-shaped body adapted to fit in the receiving vessel, and a handle projecting from the said body, substantially as described.

2. In a transplanter, the combination with a receiving vessel, of a delivering device, consisting of a body having a central concave portion, and a horizontal flanged portion, and a handle secured to the central portion of the body, substantially as described.

FREDERICK RICHARDS.

Witnesses:
WM. S. HALL,
HARVEY B. SMITH.